(12) United States Patent
Jones

(10) Patent No.: US 6,295,889 B1
(45) Date of Patent: Oct. 2, 2001

(54) MEANS FOR ANCHORING AN ELONGATE MEMBER

(75) Inventor: Stuart T. Jones, Murton (GB)

(73) Assignee: Adwest Bowden TSK Limited, Wales (GB)

( * ) Notice: Subject to any disclaimer, the term of this patent is extended or adjusted under 35 U.S.C. 154(b) by 0 days.

(21) Appl. No.: 09/490,489

(22) Filed: Jan. 25, 2000

(30) Foreign Application Priority Data

Jan. 26, 1999 (GB) .................................................. 99 01 554

(51) Int. Cl.[7] ....................................................... F16C 1/26
(52) U.S. Cl. ........................................... 74/502.4; 403/325
(58) Field of Search .............................. 74/502.4, 502.6, 74/201.5 R; 403/325, 327; 248/56, 27.3

(56) References Cited

U.S. PATENT DOCUMENTS

| 3,631,738 | 1/1972 | Harper . |
| 4,339,213 | 7/1982 | Gilmore . |
| 5,461,938 | 10/1995 | Froling et al. . |
| 5,579,662 | * 12/1996 | Reasoner .................... 74/502.6 X |
| 6,019,014 | * 2/2000 | Jenkins ............................ 74/502.4 |

FOREIGN PATENT DOCUMENTS

| 40 24 062 | 4/1992 | (DE) . |
| 0 703 395 | 3/1996 | (EP) . |
| 1 509 287 | 5/1978 | (GB) . |
| 1 579 840 | 11/1980 | (GB) . |
| 98/25036 | 6/1998 | (WO) . |

OTHER PUBLICATIONS

European Search Report dated Mar. 28, 2000.
UK Search Report dated May 22, 2000.

* cited by examiner

Primary Examiner—Mary Ann Green
(74) Attorney, Agent, or Firm—Marshall, Gerstein & Borun

(57) ABSTRACT

An anchoring device 1 for anchoring an elongate member to a flat plate 8 provided with a slot 6 leading to one edge 10 thereof, includes a sleeve 2 for fitting over the member and having a groove 4 slidable along the slot 6. A spring-loaded ring 14 is movable along the sleeve 2 to allow accommodation of the slotted plate within the groove 4 and is biased to interlock with a projection 12 on the plate 8.

8 Claims, 1 Drawing Sheet

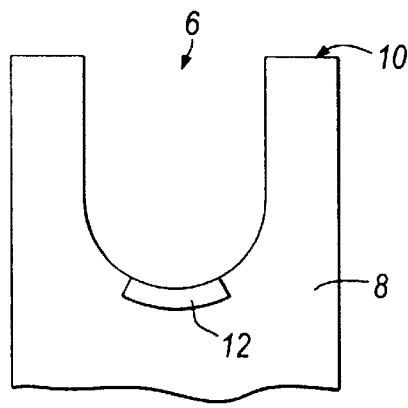
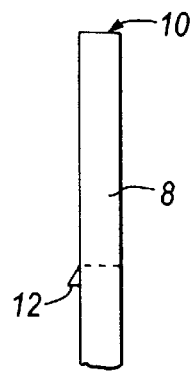
Fig.Ia    Fig.Ib
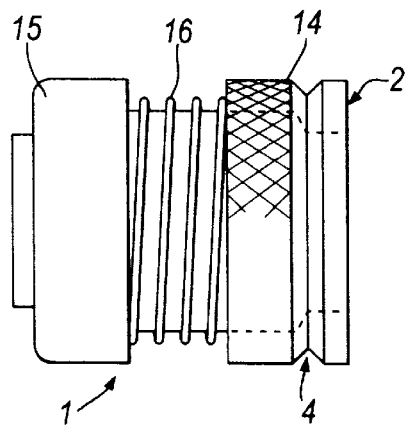
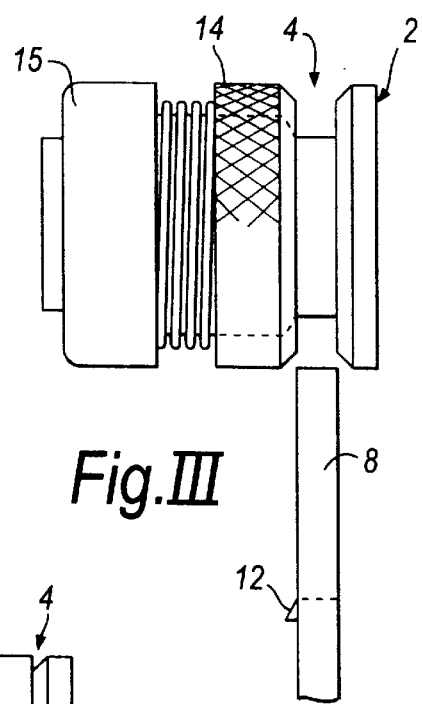
Fig.II    Fig.III
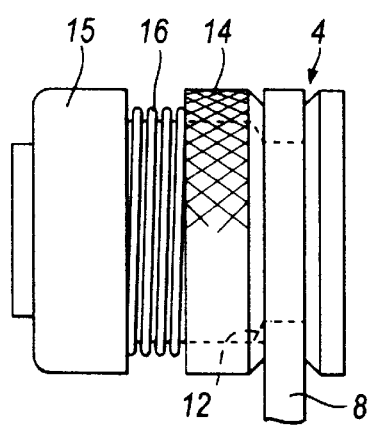
Fig.IV

MEANS FOR ANCHORING AN ELONGATE MEMBER

BACKGROUND OF THE INVENTION

This invention relates to means for anchoring an elongate member to another member. The invention is made with particular reference to the anchoring of Bowden-type cables to fixed parts of the chassis or bodywork of an automobile, and the invention will be described in that context in this specification. It will, however, be appreciated that such an anchoring member can be used for anchoring many other elongate members, and many other circumstances.

As is well known, a Bowden-type cable is a device for translating a push/pull movement at one location to a push/pull movement (in the same or any different direction) at a different location, often for control purposes, and such a cable comprises a flexible conduit in which a control wire is slidable to perform the desired function. In order for the relative movement of the control wire and the conduit to take place in a controlled manner for the reliable operation of, for example, a clutch or gearbox mechanism or throttle of a motor vehicle, it is necessary that each end of the conduit should be anchored, for example to the body of the vehicle.

In particular, the practice has developed of anchoring an end of the conduit to an opening in a bracket or bulkhead across which the control cable passes.

In a particular arrangement which is known for this purpose, this arrangement being that with which the present invention is particularly concerned, the bracket or bulkhead is provided with a generally circular hole near one edge, the hole being connected to that edge by a slot whose width is the diameter of the circular hole. That edge of a bulkhead may be a peripheral edge, or it may be an edge of another, larger hole formed within the bulkhead.

An anchoring sleeve or end fitting for the Bowden-type cable may comprise a neck of a diameter which will pass into the slot, in a direction which is parallel to the plane of the bracket or bulkhead and perpendicular to the axis of the cable, and a collar which may be slid or screwed axially of the anchor fitting to abut the bulkhead adjacent the slot and thus resist withdrawal of the anchor from the slot and also axial movement of the anchor relative to that slot.

In industry in general, and in particular in the automotive industry, there is a never ending search for the simplification or speeding up of the assembly process, and as one step in this search, there has arisen the proposal as set forth in EP-A-0 703 395 (Acco La Teledynamique SA) to provide a helically tensioned spring for the automatic screwing of such a collar. Such construction is, however, somewhat complicated, and it requires accurate centering within the slot before reliable anchoring can take place.

BRIEF SUMMARY OF THE INVENTION

It is an object of this invention to provide an anchoring device in which a proper and reliable anchoring can be achieved easily and quickly.

According to the present invention, there is provided an anchoring device which is suitable for anchoring an elongate member to a flat member having a slot leading to an edge thereof, which anchoring device comprises a sleeve which is fixable coaxially around said elongate member and which is formed with a peripheral groove whose axial length is sufficient to accommodate the thickness of such flat member at said slot, such groove defining a neck which is a close fit into said slot, and at least one ring member carried by the sleeve which is axially movable along said sleeve from a position in which it is spaced from and clear of said groove into a position in which it is adjacent said groove, in which position said ring forms an interlock with a projection on said flat member such as to prevent and resist withdrawal of the anchoring sleeve from the slot in the flat member.

Such an anchoring sleeve can be secured to a said flat member constituted by a portion of a bracket or bulkhead extremely easily and quickly to form a reliable anchorage for an elongate member surrounded by the sleeve.

BRIEF DESCRIPTION OF THE DRAWINGS

A preferred embodiment of an anchoring device according to the invention will now be described by way of example only, with reference to the accompanying diagrammatic drawings in which:

FIG. I*a* shows a flat plate or bulkhead member;

FIG. I*b* shows a side view of the plate or bulkhead member shown in FIG. I*a*;

FIG. II shows a side view of the device;

FIG. III shows the device of FIG. II in a first position in relation to the flat plate or bulkhead member of FIG. I; and FIG. IV shows the device of FIG. II in a second position in relation to the flat plate or bulkhead member of FIG. I.

DETAILED DESCRIPTION OF THE INVENTION

Referring to the drawings, there is shown an anchoring device 1 including a sleeve 2 adapted for fitting over an elongate member (not shown) such as a Bowden-type control cable. The sleeve 2 has a groove 4 which is slidable along a U-shaped slot 6 formed in a flat plate or bulkhead member 8, the slot 6 leading to an edge 10 of the plate 8 and a projection or latch 12 being formed adjacent the base of the slot 6.

A ring 14 is movable along the sleeve 2 against the pressure of a spring 16, which is held at its other end by a retaining cap 15 fixed on the sleeve 2; the ring is movable to a position where it is spaced from and clear of the slot 6 to allow the sleeve 2 to be engaged in the slot 6 in the flat plate or bulkhead member 8.

In FIG. IV the ring 14 is shown moved along the sleeve 2 to a position abutting the flat plate or bulkhead member 8 and interlocking with the projection 12 thereon to prevent withdrawal of the sleeve 2 from the slot 6. In this position the sleeve 2 is firmly anchored to the flat plate or bulkhead member 8; and hence any control cable passing through the sleeve 2 will be firmly anchored in the bulkhead or the like.

The sleeve 2 can be disengaged from the slot 6 after first sliding the ring 14 to the left of the drawing against the action of the spring 16 so that it no longer interlocks with the projection 12 on the flat plate or bulkhead member 8.

What is claimed is:

1. An anchoring assembly for anchoring an elaborate member to a flat member, including in combination an anchoring device, the elongate member and the flat member, a slot formed in the flat member and leading to an edge thereof, the anchoring device comprising a sleeve which is fixable coaxially around said elongate member, a peripheral groove formed on the sleeve, the axial length of the groove being sufficient to accommodate the thickness of such flat member at said slot, such groove defining a neck which is a close fit into said slot, and at least one ring member carried by the sleeve which is axially moveable along said sleeve from a first position in which it is spaced from and clear of said groove into a second position in which it is adjacent said groove, a projection being proved on said flat member, and in said second position the ring member forming an interlock with the projection such as to prevent and resist withdrawal of the sleeve from the slot in the flat member.

2. The assembly according to claim 1 in combination which a Bowden-type cable.

3. The assembly according to claim 1 in which the projection on the flat member is formed of a lip protruding from the surface of the flat member adjacent the base of the slot and engageable with the ring member.

4. The assembly according to claim 3 in combination which a Bowden-type cable.

5. The assembly according to claim 1 in which the at least one ring member of the anchoring device is spring-loaded towards the second position.

6. The assembly according to claim 5 in combination which a Bowden-type cable.

7. The assembly according to claim 5 in which the spring-loaded is effective by an open coil compression spring.

8. The assembly according to claim 7 in combination which a Bowden-type cable.

* * * * *

UNITED STATES PATENT AND TRADEMARK OFFICE
CERTIFICATE OF CORRECTION

PATENT NO. : 6,295,889 B1
DATED : October 2, 2001
INVENTOR(S) : Stuart T. Jones

It is certified that error appears in the above-identified patent and that said Letters Patent is hereby corrected as shown below:

<u>Column 2,</u>
Line 56, delete "elaborate" and substitute therefor -- elongate --.

<u>Column 3,</u>
Line 2, delete "proved" and substitute therefor -- provided --.

<u>Column 4,</u>
Line 7, delete "spring-loaded" and substitute therefor -- spring-loading --.

Signed and Sealed this

Second Day of April, 2002

*Attest:*

JAMES E. ROGAN
*Attesting Officer*     *Director of the United States Patent and Trademark Office*